Aug. 23, 1949.  I. W. DOUGLASS  2,479,606
AIR GAUGE DETECTING DEVICE
Filed June 6, 1944
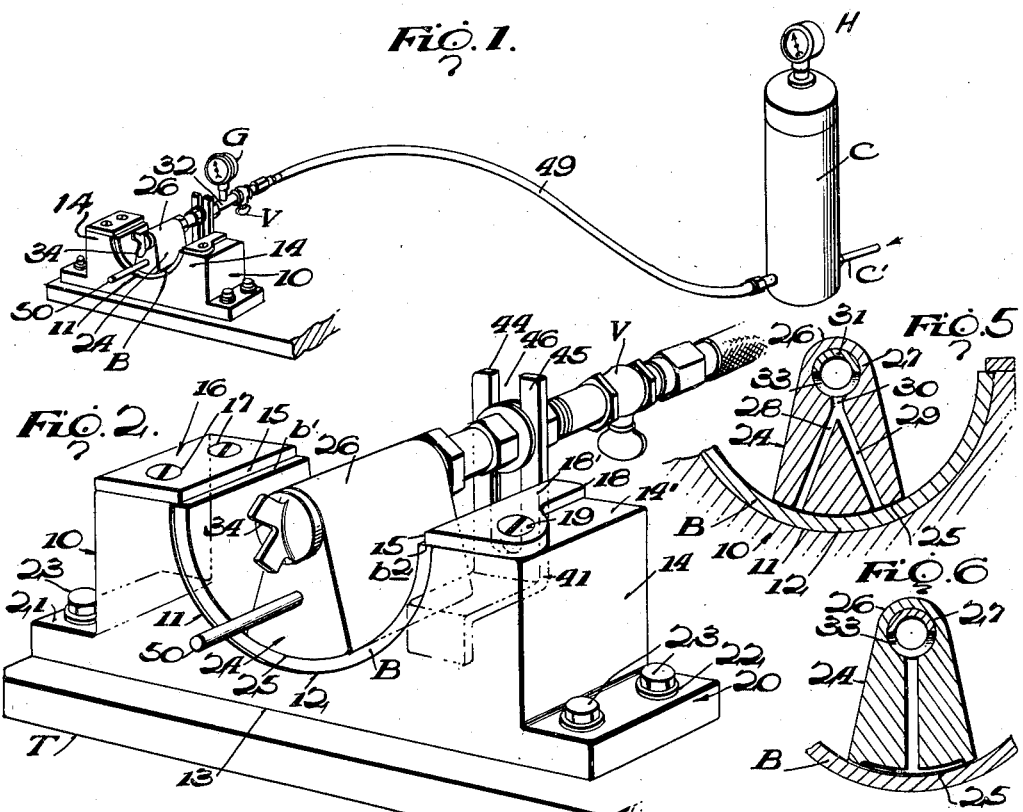
Isaac W. Douglass Patented Aug. 23, 1949

2,479,606

UNITED STATES PATENT OFFICE 2,479,606

AIR GAUGE DETECTING DEVICE

Isaac W. Douglass, Indianapolis, Ind., assignor of one-half to Ernest F. Pohl, St. Louis, Mo.

Application June 6, 1944, Serial No. 538,902

3 Claims. (Cl. 73—37.5)

This invention relates to an air gauge. The air gauge is particularly adapted to detect and indicate imperfections such as flaws, indentations and projections existing in or on various surfaces.

This air gauge is such that the aforesaid flaws, imperfections etc. may be detected and indicated whether such surfaces be plane, irregular, curved or otherwise.

The gauge is particularly suitable and adaptable for detecting and indicating imperfections, such as indentations or projections, or both, or other flaws that exist in bearings for motors and other machine parts and especially bearings of the so-called half or split type.

The present practice of detecting imperfections, flaws and the like, in or on split bearings and other articles is to employ mechanical or electrical contact devices. In other words, the devices now used actually contact the surface of the bearing or the like that is to be gauged or tested to determine imperfections. These devices of the so-called contact type, whether mechanical or electrical, no matter how carefully used and even though used by a skilled technician, necessarily must contact the surface and in doing so, as, for instance, in connection with the surface of a bearing, which is highly finished, results in marring the highly finished surface of the bearing and, therefore, defeats the primary object, namely, to only detect imperfections.

These so-called contact gauging devices are further objectionable in that the point of contact is indeed minute and, therefore, it is impossible for all or even a major part of the surface to be gauged or tested to be contacted by these devices and here again it is clear that the detection of imperfections throughout even a small surface cannot be accomplished. This is so, no matter how skilled and how careful the operator may be.

Another form of detecting imperfections in surfaces, including the surface of a split bearing or the like, is the X-ray method. This method, while being practicable from some view points, also lacks the detection of certain surface indentations and projections and totally lacks the giving of any indication except by bringing in the human element of observation.

It will be seen from the foregoing, therefore, that the known mechanical and electrical devices for detecting flaws, imperfections and the like in or on surfaces, such as the highly finished surface of a split bearing, and also the X-ray method of detection, is a rather hit or miss proposition and certainly does not result in an accurate detection of imperfections or most certainly is not a precision detection of imperfections in bearings or the like, and an indication of such imperfections. Moreover, any method of detecting flaws or imperfections in or on surfaces, such as the highly finished surface of a bearing, where contact is depended upon, is not desirable because contact of the device used results in its imparting minute indentations or other marks to the article or surface to which it is applied and contacts.

My air gauge is designed and used so that there is not at any time during the detecting for flaws or imperefctions, whatever they may be, in any surface, a contact of the device itself with the work, whatever it may be, even including the curved, highly finished surface of a split bearing or the like. Then, too, my air gauge is such that in addition to detecting flaws or imperfections in any surface, including the surface of a split bearing, it will also indicate the point or points of the entire surface where such flaws or imperfections exist. Further, my air gauge is such that an entire surface can be detected for flaws or imperfections, regardless of the size or contour of such surface, and an accurate indication of such flaws or imperfections given.

It is the object of my invention to provide a gauge for detecting flaws or imperfections in or an various surfaces by a device which is at all times out of contact with said surface.

Another object of my invention is to provide an air gauge for detecting flaws or imperfections in or on various surfaces by subjecting such surface to a blast of air from said gauge.

Another object of my invention is to produce an air gauge for detecting and indicating flaws or imperfections in surfaces such as the highly finished surface of a split bearing by employing an air blast to be directed against the surface to be gauged.

It is a further object of my invention to provide an air gauge for detecting and indicating flaws or imperfections in surfaces, such as the highly finished surface of a split bearing, by employing a device and projecting a blast of air therefrom, said device being movable over, but out of contact with, the surface being gauged.

Another object of my invention is to provide a device for detecting and indicating flaws or imperfections in split bearings or the like, such device being of simple and inexpensive construction, yet performing its function of detecting and indicating flaws or imperfections in a highly efficient manner and not requiring the services of a skilled technician.

A still further object of the invention is to provide a gauging device for detecting and indicating flaws or imperfections in split bearings or the like, wherein the possibility of marring the surface being gauged is entirely eliminated.

Still further objects of the invention will become apparent from the description hereinafter, when considered with the drawings, wherein:

Fig. 1 is an elevational view showing all of the essential parts of my gauging device, with a split bearing held in position for an accurate gauging to determine and indicate flaws or imperfections;

Fig. 2 is a perspective view of my gauging device, showing the major parts more in detail and with the bearing in position to be gauged;

Fig. 3 is a side elevational view showing the movable gauging head, and the manner in which it is supported during the gauging operation;

Fig. 4 is a vertical cross sectional view showing the interior construction of the movable gauging head and the end of the air supply pipe supporting the movable gauging head and the manner in which the latter is attached to said pipe;

Fig. 5 is a transverse vertical sectional view taken on the lines 5—5 of Fig. 3;

Fig. 6 is a transverse vertical sectional view showing the movable detecting head in its position with respect to and slightly spaced from the surface of a bearing or the like to be gauged;

Fig. 7 is a perspective view of the movable gauging head in an inverted position in order to show the arcuate face thereof and the formation of the spaced air openings in its arcuate face;

Fig. 8 is a modification of the movable gauging head showing the oppositely spaced air openings and a connecting groove between said openings; and Fig. 9 is a further modification of the movable gauging head showing an air opening slot extending substantially transversely across the entire arcuate face medially thereof.

The invention will be more readily understood by referring to the drawings in detail, which are described as follows:

The essential characteristics of the invention consist of a support or nest 10 which, as shown, takes the form of a solid block, preferably rectangular and of metal or other suitable rigid, hard material. This support or nest 10 is provided, intermediate its ends, with an arcuate recess 11, which recess is in the form of a semi-circle and extends throughout substantially 180° of a circle. The recess 11 terminates as at 12 above the bottom of the support 13 or nest 10 at its lowest point, and extends to the top of the block, as will be seen, and provides substantially rigid upstanding supports 14 at each side of the recess.

The recess 11, it will be understood, takes the form of the article to be gauged, whatever it may be. In this instance, the article to be gauged is a split bearing B which is a conventional bearing for an airplane motor or the like. This bearing B fits snugly and securely in the recess 11 in the support 10 and is held therein by means of an overhanging flange 15 which is in effect the outer edge of a metallic plate or the like 16, the latter being secured to the upper face of the upstanding wall 14 by means of suitable bolts or other fastening devices 17. It is to be noted that the flange portion 15 of the plate extends over substantially one-half of the width of the end of the split bearing. The bearing B is further held in the recess 11 at the opposite support 14 by means of a movable camming holding and securing member 18, which is pivotally mounted, as at 19, to the upper face 14' of the support 14.

It will be seen, therefore, that when the end $b'$ of the split bearing B is engaged on the under side of the flange 15 and the camming member 18 is in holding and securing position, as shown particularly in Fig. 2, wherein the outer edge 18' of the camming member projects over substantially one-half of the width of the other end $b^2$ of the bearing B, the bearing B will be fixed and secured in an immovable position in its support.

The support 10 for the bearing is preferably provided with laterally extending lugs or projections 20 and 21 at each lower end of the block or support, which projections have spaced openings 22 therein and through which suitable bolts or other securing means 23 extend and provide means to firmly secure the nest or support 10 to a work table or the like T.

The means for detecting the flaws or imperfections in bearings or the like comprise a substantially wedge-shaped movable head 24 having an arcuate face 25 at one end thereof and at its other end assuming a substantially cylindrical shape 26 and providing interiorly thereof a bore or opening 27. This detecting head may, of course, be of one piece, cast or molded of metal or other suitable material, or, if preferred, may be of two parts that are integrally joined. The movable head is preferably of metal so as to impart weight thereto and its wedge-shaped portion is rigid and solid throughout except for the diverging air passageways 28 and 29 connecting with an opening 30 therein which opening 30 is in the lower portion of the cylindrical formation 26.

The movable detecting head 24, as will be clearly seen in Fig. 4, is positioned and arranged on the end 31 of a rigid air supply pipe 32 and the cylindrical portion thereof is concentrically disposed with respect to the said end of the air supply pipe. An arcuate slot or opening 33, which extends through substantially 180° of the circumference of the air supply pipe 32, is formed inwardly of the extreme end of the air supply pipe 32 and this slot is in register with the opening 30 in the movable detecting head 24 in the latter's movement of substantially 180°.

The movable detecting head 24 is removably and detachably mounted on the end of the rigid air supply pipe 32 by means of a wing-nut 34 having reduced exterior threads 35 engaging interior threads 36 in the extreme end of the air supply pipe 32 and is further removably and detachably secured on the air supply pipe 32 by means of a packing nut 37 having reduced exterior threads 38 which engage interior threads 39 within the cylindrical portion 26 of the detecting head.

Air is prevented from leaking past the movable detecting head and its cylindrical portion and the air supply pipe 32 by means of suitable packing 40 which the packing nut 37 engages and which nut is, of course, adjustable to various degrees of pressure on the packing for preventing leakage of air.

Thus the aforesaid mounting of the movable detecting head provides for interchangeability of different types and sizes of detecting heads by simply removing the wing-nut 34 and if a detecting head is in place, removing it and positioning another and different type of detecting head on the end of the pipe 32 and securing it thereto as recited hereinbefore.

It is understood that different sizes and types of bearings will require different detecting heads and, therefore, the necessity for making the heads detachable and interchangeable.

It is necessary to provide some rigid support for the air supply pipe 32 and this is accomplished by a support 41 which is substantially L-shaped and has one portion 42 thereof secured to the side of the base or nest 10 at a point centrally of the recess 11 therein. The support 41 may be secured to the base by means of bolts 43, or by any other securing means. The upper portion of the support 41 is in the form of a yoke or U-shaped, and provides upstanding spaced legs 44 and 45, resulting in a space 46 therebetween. The spaced legs 44 or 45 or both may be suitably marked with graduations or calibration lines or the like in order to determine the proper height of the movable detecting head with respect to the various surfaces, such as bearings, that are to be tested and gauged.

The air supply pipe 32 is positioned between the aforesaid legs in the space 46 and is rigidly held in any desired position therein by means of a jam nut 47 threaded on exterior threads 32' and which jam nut is disposed on one side of the bracket and a somewhat similar jam nut 48 on the other side of the bracket. When the two jam nuts 47 and 48 are brought together to grip the legs 44 and 45 of the bracket the rigid air supply pipe 32 is then firmly fixed in position and extends into the recess 11 in the support and centrally thereof so as to position the attached movable detecting head 24 directly at the center of the bearing mounted in the support. This securing of the rigid air supply pipe 32 to its support 41 provides a definite means of centering the detecting head 24 with respect to the bearing to be gauged, as will be clearly seen in Fig. 2.

In Fig. 3 the air supply pipe 32 extends through its support or bracket 41 and terminates at 32a. A conventional air pressure gauge G, having the usual indicating needle, is suitably secured to the air supply pipe 32 and is connected therewith so as to derive a pressure indication from the source of air supply as will be presently described.

To the end 32a of the rigid air supply pipe 32 there is detachably connected a flexible air supply hose or the like 49 which extends to and is connected with a suitable container C which container has therein a predetermined supply of compressed air or air under pressure. The air under pressure is supplied to the container from any suitable source of supply, such as an air compressor or pump (not shown) attached to an inlet pipe c', which extends outwardly from the lower portion of the container C. A suitable air gauge H, having the usual indicating needle, is mounted on and is connected with the container C and has air pressure connection therewith so as to give an indication of the air pressure within the container C.

The air passages 28 and 29 in the detecting head 24 extend to suitable spaced openings 24' in the arcuate face 25 thereof, as will be clearly seen in Fig. 7.

In Fig. 8 the same air openings 24' are provided but are connected by means of the shallow groove 24a, and in this instance it will be seen that the air issuing from the openings 24' will flow into the grove 24a and consequently the air issuing therefrom will be distributed over the entire face of the article being gauged.

In the modification of the detecting head, as shown in Fig. 9, the arcuate face 25 is the same as in the other detecting heads, but in lieu of the spaced openings a slot 25' is provided and this slot is connected with the air passageways 28, 29 and provided for a discharge of air over the entire surface that is being gauged to determine flaws or imperfections. In each instance a suitable handle or other hand grip 50, which is affixed to the detecting head, is provided so that the detecting head 24 may be moved over the surface being gauged by an operator.

A suitable valve V is provided in the air supply line 32 in order to permit flow, when opened, of air under pressure from tank C to the gauge G and the detecting head.

The operation of my air gauge is very simple indeed and one mode of procedure or method in gauging bearings for imperfections and the like is that a perfect or master bearing is first secured in the support or nest 10, as referred to herein, the valve V then opened, and the handle 50 is then gripped by the operator who moves the detecting head 24 over the entire surface of this bearing and, this bearing being perfect, there will be no fluctuation or indication of the needle of the gauge G and this will, of course, indicate a perfect bearing having no surface indentations or projections or any other marred condition.

Then a bearing to be gauged is similarly secured in the support 10 and when the operator moves the detecting head 24 over the surface thereof, should there be any surface flaws or indentations or projections or any other marred finish, such condition will be indicated by the needle of the gauge G. If the imperfection or flaw be an indentation or indentations, the indication of the needle of the gauge G will be a "minus" and should such imperfection or flaw be a projection or projections, the indication of the needle of the gauge G would be a "plus" one. This is due to the fact that if an indentation or a plurality of indentations, even though very minute, exist in the surface of the bearing, more air will flow through the openings or the slot, as the case may be, in the arcuate face of the detecting head, and thus a "minus" indication will be given by the needle of the gauge G. On the other hand, if a projection or projections should be present on the surface of the bearing, then less air will flow through the openings or slot in the arcuate face of the detecting head, as the case may be, and, therefore, a "plus" indication will be given by the needle of the gauge G.

It will be seen, therefore, that commencing with a master bearing which is perfect, and then testing or gauging other bearings in accordance with the setting of the detecting head 24 with respect to the master bearing, any flaws or imperfections in or on the bearing to be tested or gauged will immediately be determined and indicated by means of the indicator needle of the gauge G. Such an imperfection or flaw showing up, the workman or operator then removes the bearing from the fixed support 10 and if the imperfections are too great, the bearing is discarded; otherwise it can be reclaimed or refinished to overcome the imperfection.

The supply of air under pressure in the container C is maintained constant and this will be indicated by the needle of the gauge H attached to the container. It is clear, therefore, that with the constant supply of air under pressure from the container C to the movable detecting head 24 and the fact that this detecting head is slightly spaced from the surface of the bearing to be tested, as is clearly seen in Fig. 6, so long as the surface of that bearing is perfect, as the detecting head is moved thereover, a constant and predetermined amount of air only can escape from the openings or the slot in the arcuate detecting head and, therefore, there will be no indication given by the needle of the gauge G, but immediately upon encountering any imperfection or flaw, in the movement of the detecting head 24 over the bearing surface, an indication will be given by the needle of the gauge G, because either the amount of air escaping from the head will be diminished, as where there is a projection or projections encountered, or will be increased, when an indentation or indentations are encountered and this function is unfailing in any regard.

From the foregoing it will be seen that with my air gauging device there is no guesswork in gauging bearings and other surfaces and such gauging by the use of my device and method results in an accurate detection and indication of the actual state and condition of the bearing or other article or surface.

It is to be kept in mind that in gauging different bearings and different types of bearings, the air pressure from the supply container C must necessarily have to be regulated in accordance with the particular bearing or surface being gauged.

While I have shown as a preferred modification of my invention the detecting head as being movable, it is to be understood that in some instances it may be preferable to fix this detecting head or means and move the work or article to be gauged with respect thereto.

I claim:

1. In a device for detecting and indicating imperfections in a split bearing, means for fixedly positioning and holding the split bearing, and detecting means including a support extending axially of the split bearing, said detecting means also including a member mounted on said support for arcuate movement concentric with the split bearing and having an outer portion spaced a predetermined distance from the split bearing, said member having an air conduit extending to said outer portion to discharge air onto the split bearing, means for supplying air under constant pressure to said conduit, and a gauge in communication with said conduit to indicate any variation in air flow from said conduit due to imperfections in the split bearing.

2. In a device for detecting and indicating imperfections in a split bearing, means for fixedly positioning and holding the split bearing, and detecting means including a support extending axially of the split bearing, said detecting means also including a member mounted on said support for arcuate movement concentric with the split bearing and having an outer arcuate face portion spaced a predetermined distance from the split bearing, said member having an air conduit extending to said face portion to discharge air onto the split bearing, means for supplying air under constant pressure to said conduit, and a gauge in communication with said conduit to indicate any variation in air flow from said conduit due to imperfections in the split bearing.

3. In a device for detecting and indicating imperfections in a split bearing, means for fixedly positioning and holding the split bearing, and detecting means including a cylindrical tubular support extending axially of the split bearing, said support being closed at one end and open at its other end, said detecting means also including a member mounted on said support for arcuate movement concentric with the split bearing and having an outer face portion spaced a predetermined distance from the split bearing, said member having an air conduit communicating with the interior of said tubular support, said conduit extending to said outer face portion to discharge air onto the split bearing, means for supplying air under constant pressure to said conduit including a pipe connection with the tubular support at the open end thereof, and a gauge in communication with said conduit to indicate any variation in air flow from said conduit due to imperfections in the split bearing.

ISAAC W. DOUGLASS.

REFERENCES CITED

The following references are of record in the file of this patent:

UNITED STATES PATENTS

| Number | Name | Date |
| --- | --- | --- |
| 1,901,966 | Hoffman et al. | Mar. 21, 1933 |
| 1,919,546 | Fletcher | July 25, 1933 |
| 1,927,750 | Mennesson | Sept. 19, 1933 |
| 1,971,271 | Mennesson | Aug. 21, 1934 |
| 1,982,528 | Mennesson | Nov. 27, 1934 |
| 2,019,541 | Masten | Nov. 5, 1935 |
| 2,026,187 | Mennesson | Dec. 31, 1935 |
| 2,240,278 | Abbott | Apr. 29, 1941 |
| 2,254,259 | Aller | Sept. 2, 1941 |
| 2,335,390 | Crist | Nov. 30, 1943 |
| 2,345,732 | Davies et al. | Apr. 4, 1944 |

FOREIGN PATENTS

| Number | Country | Date |
| --- | --- | --- |
| 350,796 | Great Britain | June 18, 1931 |

OTHER REFERENCES

Page 119 of March 1944 issue of Scientific American.